United States Patent [19]

Lee et al.

[11] Patent Number: 4,916,658
[45] Date of Patent: Apr. 10, 1990

[54] DYNAMIC BUFFER CONTROL

[75] Inventors: Chien-Chyun Lee; Charles R. Moore, both of Austin, Tex.

[73] Assignee: International Business Machines Corporation, Armonk, N.Y.

[21] Appl. No.: 135,170

[22] Filed: Dec. 18, 1987

[51] Int. Cl.⁴ ............................................. G06F 13/14
[52] U.S. Cl. ................................ 364/900; 364/933.6; 364/923.6
[58] Field of Search ... 364/200 MS File, 900 MS File

[56] References Cited

U.S. PATENT DOCUMENTS

| | | | |
|---|---|---|---|
| 3,573,745 | 4/1971 | May, Jr. et al. | 364/900 |
| 3,771,142 | 11/1973 | Minshull et al. | 340/172.5 |
| 4,125,870 | 11/1978 | Suzuki et al. | 364/900 |
| 4,138,732 | 2/1979 | Suzuki et al. | 364/900 |
| 4,145,755 | 3/1979 | Suzuki et al. | 364/900 |
| 4,159,532 | 6/1979 | Getson, Jr. et al. | 364/900 |
| 4,535,420 | 8/1985 | Fung | 364/900 |
| 4,682,284 | 7/1987 | Schrofer | 364/200 |
| 4,692,893 | 9/1987 | Casper | 364/900 |

OTHER PUBLICATIONS

IBM Technical Disclosure Bulletin, vol. 20, No. 10, Mar. 1978, "FIFO Queue Edit Mechansim" by A. L. Bergey et al.
IBM Technical Disclosure Bulletin, vol. 24, No. 12, May 1982, "Modular Buffer Allocation Control Logic" by D. C. Haigh.
IBM Technical Disclosure Bulletin, vol. 20, No. 8, Jan. 1978, "Data Management in a Circular Buffer" T. A. Chapman et al.

Primary Examiner—Gareth D. Shaw
Assistant Examiner—Debra A. Chun
Attorney, Agent, or Firm—Thomas E. Tyson

[57] ABSTRACT

A buffer for storing data words consisting of several storage locations together with circuitry providing a first indicator that designates the next storage location to be stored into, a second indicator designating the next storage location to be retrieved from, and circuitry that provides the number of locations available for storage and the number of locations available for retrieval. Furthermore, the buffer includes the capability to store and retrieve several data words simultaneously.

12 Claims, 6 Drawing Sheets

DYNAMIC BUFFER CONTROL

DESCRIPTION

1. Technical Field

The present invention relates to data processing systems, and in particular to circuitry for temporarily storing data in data processing systems.

2. Background Art

Data processing systems perform their functions by moving data and performing operations on this data. Often it it necessary to temporarily store data that is being transferred from one device to another in a data processing system. Circuitry for this temporarily storage is often called a buffer. Commonly, buffers are use to store several data words at a time.

Buffer management requires that the location of data stored in the buffer be known. Specifically the next available location for storage and the location previously stored must be known. Furthermore, there must be a capability for determining when the buffer is full or empty.

One type of buffer that is quite commonly used in data processing systems is termed a circular buffer or circular queue. In a circular queue, there is no bottom or top to the queue but the queue positions are circular in arrangement. A circular queue may contain any number of storage positions. The management of the circular queue requires that the "head" and the "tail" of the queue must be known. The head is the next position in the queue that is to be written into. The tail is the next position of the queue that is to be read from. The tail of the queue must always follow the head of the queue. However, the head of the queue should never lap the tail of the queue.

In general, the head of the queue is pointed to by an "inkey" pointer. The tail of the queue is pointed to by an "outkey" pointer. A capability must be provided to insure that the inkey pointer does not lap the outkey pointer.

U.S. Pat. No. 3,771,142 entitled "Digital Data Storage System" discloses a circular queue that is used to store data for several input/output devices.

*IBM Technical Disclosure Bulletin*, volume 20, number 8, January, 1978, pages 3309–3310, entitled "Data Management in a Circular Buffer", discloses a technique to manage the operation of a circular buffer. *IBM Technical Disclosure Bulletin*, volume 24, number 12, May, 1982, pages 6240–6243, entitled "Modular Buffer Allocation Control Logic", discloses circuitry for controlling several data buffers that are being written to and read from in sequence. The circuitry illustrated provides an indication of when buffers are available for read and write operations. *IBM Technical Disclosure Bulletin*, volume 20, number 10, March, 1978, page 4130, entitled, "FIFO Queue Edit Mechanism", discloses a technique for preventing the heat pointer from wrapping the tail pointer.

A current trend in data processing is that of parallel processing. In parallel processing several data operations are conducted simultaneously. Such an environment places unusual demands on other elements in the data processing system, such as data buffers or data queues.

It is an object of the present invention to provide a dynamic buffer that is capable of performing a multiple of data reads or data writes in a single machine cycle.

It is the further object of the present invention to provide a buffer controller that provides pointer information and buffer capacity simultaneously during a single machine cycle.

DISCLOSURE OF THE INVENTION

In accordance with the present invention an apparatus for storing data words is provided. This apparatus includes a plurality of storage locations connected to a control circuit. The control circuit provides a first indicator that designates a next one of the storage locations that is to be stored into. The control circuit further includes a circuit that provides a second indicator that designates a next one of the storage location to be retrieved from. The control circuitry also provides the number of storage locations available for storage. The control circuitry controls the simultaneous storage or retrieval of several data words simultaneously from the storage locations.

In the preferred embodiment, the buffer is a circular queue. The circular queue includes an inkey pointer for indicating the next storage location to be stored into and an outkey pointer for indicating the next storage location to be retrieved from. Further control circuitry is provided that includes the means to simultaneously compute from the inkey and outkey pointers and the queue size, the number of empty buffer locations and the number of full buffer locations. These computations are used by the control circuit to provide simultaneous storage or retrieval of several data words.

BRIEF DESCRIPTION FOR THE DRAWING

The novel features believed characteristic of the this invention are set forth in the appended claims. The invention itself, however, as well as other features and advantageous thereof, would be best understood by reference to the following description of the best mode for carrying out the invention, when read in conjunction with the accompanying figures, wherein:

BEST MODE FOR CARRYING OUT THE INVENTION

The present invention relates to a buffer that provides a temporary storage of data words. One uniqueness of the present buffer invention is that it provides for the simultaneous storage or retrieval of several data words during a single processing cycle. This feature is very important for parallel processing systems. This enables the parallel processing systems to store or retrieve simultaneously data words that are being used in the different data processing operations that are being conducted simultaneously.

Figure 1:
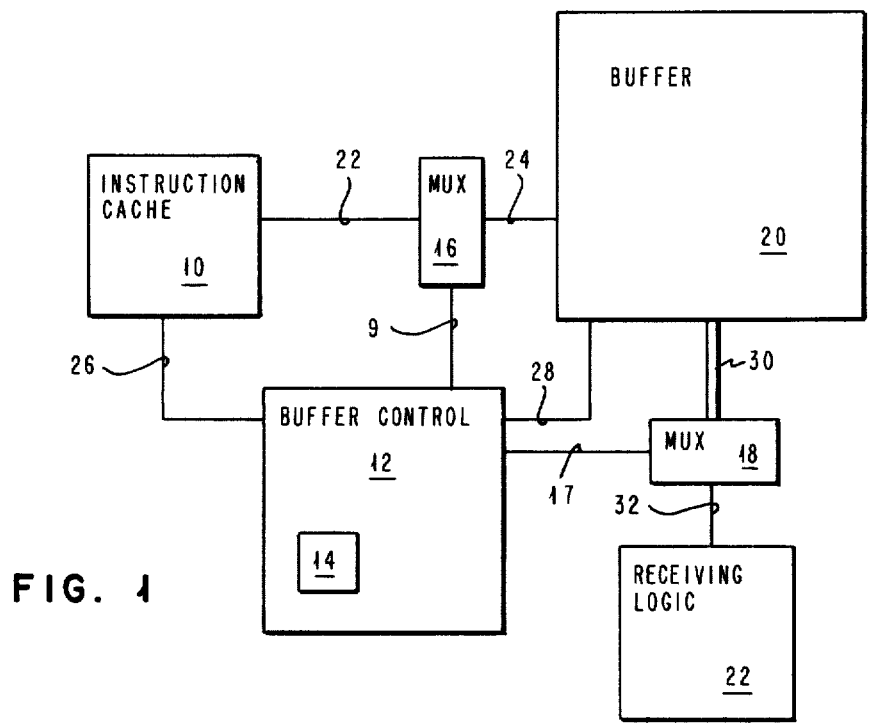
FIG. 1 is a block diagram of a data buffer.

FIG. 1 is a block diagram that illustrates the embodiment of the present invention. In FIG. 1, and instruction cache 10 provides the temporarily storage of a large number of individual of instructions for execution by a data processor. These instructions are treated by the buffer as data words. The instructions cache 10 provides an output over line 22 to a multiplexor 16. The purpose of the multiplexor 16 is to receive simultaneously from the instruction cache 10 several instructions or data words which are then specifically aligned by the inkey pointer and the available storage in buffer 20 for parallel transfer across lines 24 into the buffer 20. The buffer control circuit 12 provides the control signals on line 26 to the instruction cache 10 to initiate the information transfer across lines 22. Line 9 includes control signals from the buffer control 12 to multiplexor 16 to align the instructions in accordance with the inkey and the available storage in buffer 20. The buffer control 12 further controls storage of information on the parallel lines 24 to buffer 20 with control signals transmitted to buffer 20 on line 28. Buffer 20 provides an output of several data words simultaneously on line 30 to a multiplexor 18. Multiplexor 18 maintains the order of the instructions in the buffer. In other words, the instructions that were first read into the buffer 20 are first read out. Buffer control 12 provides control signals to multiplexor 18 over line 17 to regulate the sequential ordering according to the outkey and the number of instructions available. It should be apparent to those skilled in the art that this multiplexor 18 may be rearranged to operate in a last in/first out manner. The output from multiplexor 18 is provided on lines 32 to receiving logic 22. In the preferred embodiment, the instructions that are output from buffer 20 are provided to instruction interlock logic (i.e. block 22) for further preprocessing before execution.

The buffer control circuit 12 operates in a manner common to most circular buffer controllers. In other words, the buffer control circuit 12 includes an inkey pointer pointing to the first buffer location in buffer 20 that is available for storage of a data word. Buffer control circuitry 12 further includes an outkey pointer that points to the first available buffer location in buffer 20 that contain data to be read from buffer 20.

Circuitry 14 of buffer control circuitry 12 computes the number of empty buffer location in buffer 20 and the number of filled buffer locations in buffer 20. These computations are accomplished simultaneously. Further, buffer control circuitry 12 includes additional circuitry to ensure that the inkey and outkey pointers are appropriately incremented and that the inkey and outkey pointers do not wrap around each other.

Figure 2:
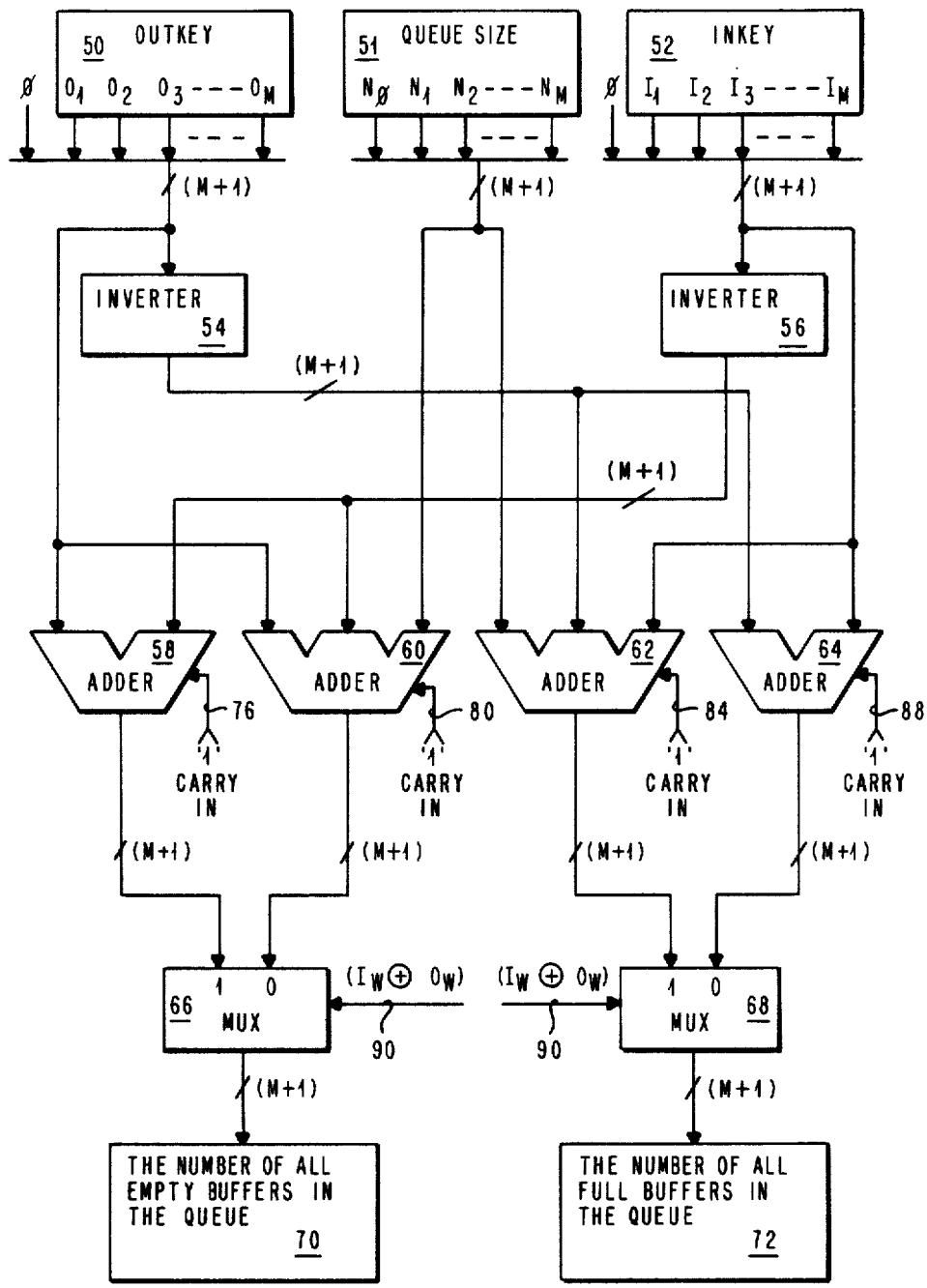
FIG. 2 is a block diagram of buffer control circuitry that provides simultaneously the number of buffer positions available for storage and the number of buffer locations filled.

FIG. 2 represents the circuitry in block 14 (FIG. 1) that provides the number of empty locations in the queue and the number of full locations in the queue. Referring to FIG. 2, latch 50 stores the outkey indicator. Latch 52 stores the inkey indicator. Latch 51 stores a number indicating the size of the queue. An inverter 54 is connected to the output of the outkey latch 50. Likewise, an inverter 56 is connected to the output of the inkey latch key 52. The output of inverters 54 and 56 together with the output of latches 50, 51 and 52 are provided to four adders 58, 60, 62 and 64 as indicated to provide 1's complement inputs. The carry input to adders 58, 60, 62, and 64 (i.e., carry in lines 76, 80, 84 and 88 respectively) are set to +1 to convert the 1's complement inputs for 2's complement operation. Adder 58 performs the arithmetic computation of subtracting the inkey indicator stored in latch 52 from the outkey indicator stored in latch 50. Adder 60 likewise subtracts the inkey indicator in latch 52 from the outkey indicator in latch 50 and adds in the queue size from latch 51. Adder 62 subtracts the outkey indicator from latch 50 from the inkey indicator in latch 52 and adds in the queue size from latch 51. Adder 64 subtracts the outkey indicator from latch 50 from the inkey indicator from latch 52. The output from adder 58 and 60 are input to a multiplexor 66 which provides either the output from adder 58 or the output from adder 60 to latch a 70. The contents of a latch 70 represents the number of empty locations in the queue. Multiplexor 66 is controlled by line 90 which provides a signal indicating the output of an Exclusive OR operation between the inkey wrap indicator and the outkey wrap indicator. Likewise multiplexor 68 is connected to adders 62 to and 64 and provides the output from either adders 62 or 64 to latch 72. The contents of latch 72 represents the number of full locations in the queue. Multiplexor 68 is also controlled by line 90.

The wrap indicators for the outkey and the inkey merely represents the relative locations of the pointers with respect to each other. In other words, since a non-circular address sequence is used by the pointers, the wrap indicator indicates whether one indicator is wrapped around the queue relative to the other indicator. In the normal operation the inkey would be incremented before the outkey is incremented. Except when the queue is empty, the inkey indicator would be numerically greater than the outkey indicator. However, since the queue is operating in a circular fashion, it is possible that the inkey indicator could have "wrapped around" the queue and actually be less than the outkey indicator. In such a circumstance, it would appear that the inkey indicator was incorrect. The wrap indicator for both the inkey and the outkey pointers merely provides a means to determine that such inconsistency has not occurred.

For an example, initially both the inkey and the outkey pointers are 0. The queue is empty. For a queue of size N, and if nothing is removed from the queue, the inkey will be incremented as entries are made. Eventually, the inkey will be incremented beyond N−1 and back to 0 where the outkey has remained. However, the wrap indicator for the inkey will be set to 1. The outkey wrap indicator remains 0. This condition indicates that the queue is full and the queue cannot accept new entries until some are removed. As entries are removed from the queue, the outkey is incremented by the appropriate amount. If nothing new is added in the queue, the outkey indicator will eventually be incremented to wrap around to 0. The position where the inkey remains. The wrap indicator for the outkey will than be set. Therefore, the wrap key for the inkey indicator and the wrap indicator for the outkey indicator would both be equal, indicating that queue is empty.

Figure 3:
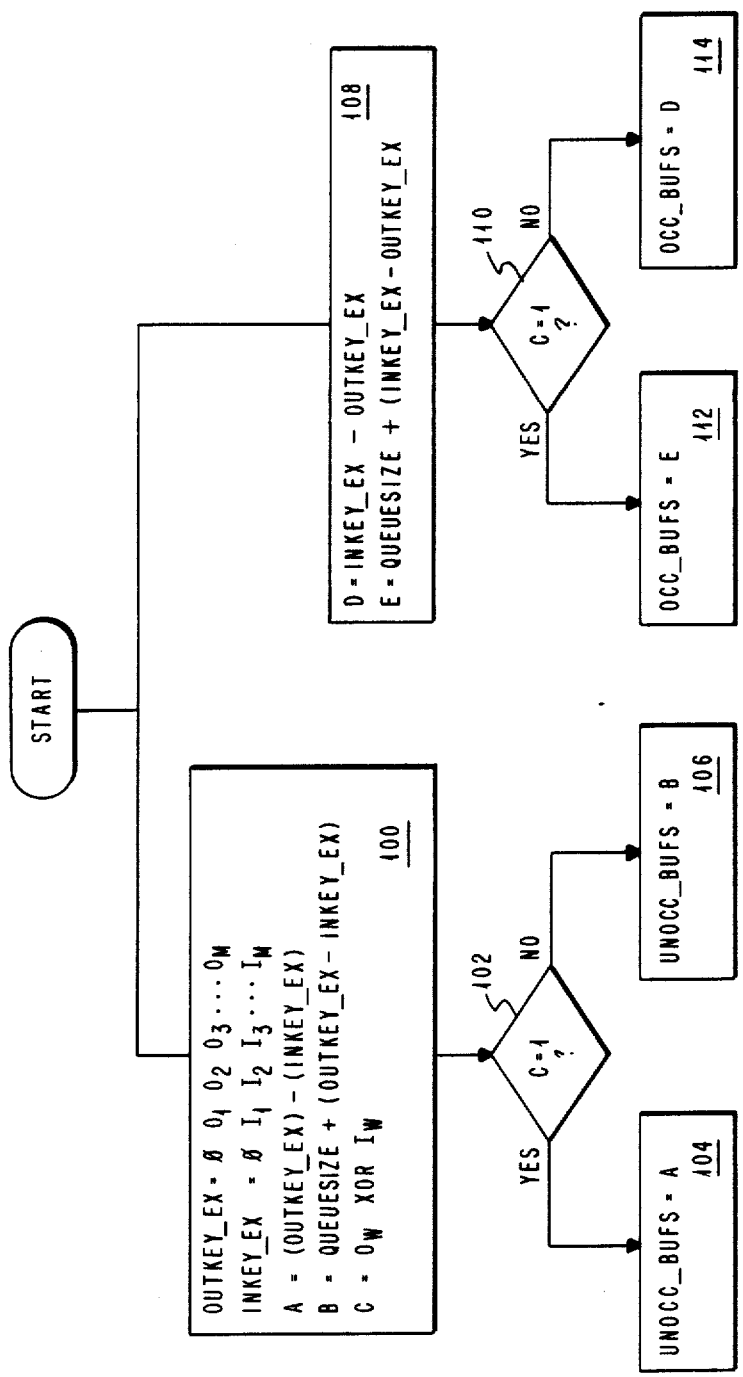
FIG. 3 is a flowchart representing the computational flow of the embodiment in FIG. 2.

The operation of the circuitry in FIG. 2 is illustrated in FIG. 3 as a flowchart. In block 100 the calculation of adders 58, 60, 62, and 64 are indicated. These calculation are made from the contents of the outkey and inkey latches with the wrap indicators not considered. Therefore, referring to block 100, variables A, B and C are computed. Variable A is the subtraction of the inkey from and outkey performed in adder 58. Variable B is the computation involving the subtraction of the inkey from the outkey and the addition of the queue size performed in adder 60. The Exclusive OR operation results in Variable C. In decision Block 102, if Variable C is equal to 1, the number of all empty locations in the queue are set equal to A in Block 104. If C is equal to zero, this number is said equal to B in Block 106.

Likewise, Block 108 represents the computations of Variables D and E. Variable D is the subtraction of the outkey in the inkey performed in adder 64. Variable E is the subtraction of the outkey in the inkey indicator and the addition of the queue size as performed in adder 62. The Variable C used in decision Block 110 is the same that is computed in Block 100. If C is equal to 1, the number of full buffers is the Variable E in Block 112. If C is equal to 0, the number of full locations is set equal to the D Variable in Block 114.

As an example, consider that the outkey wrap indicator equals 0, the outkey is set equal to 1, the inkey wrap indicator set to 0 and the inkey indicator set to 4 with the queue size of 5. Then A would be equal to minus 3, B will be equal to 2 and C will be 0. Therefore, the number of empty locations will be equal to B or 2. Variables D and E would be equal to 3 and 8 respectfully. Since C is 0, the number of full locations is 3.

Figure 4:
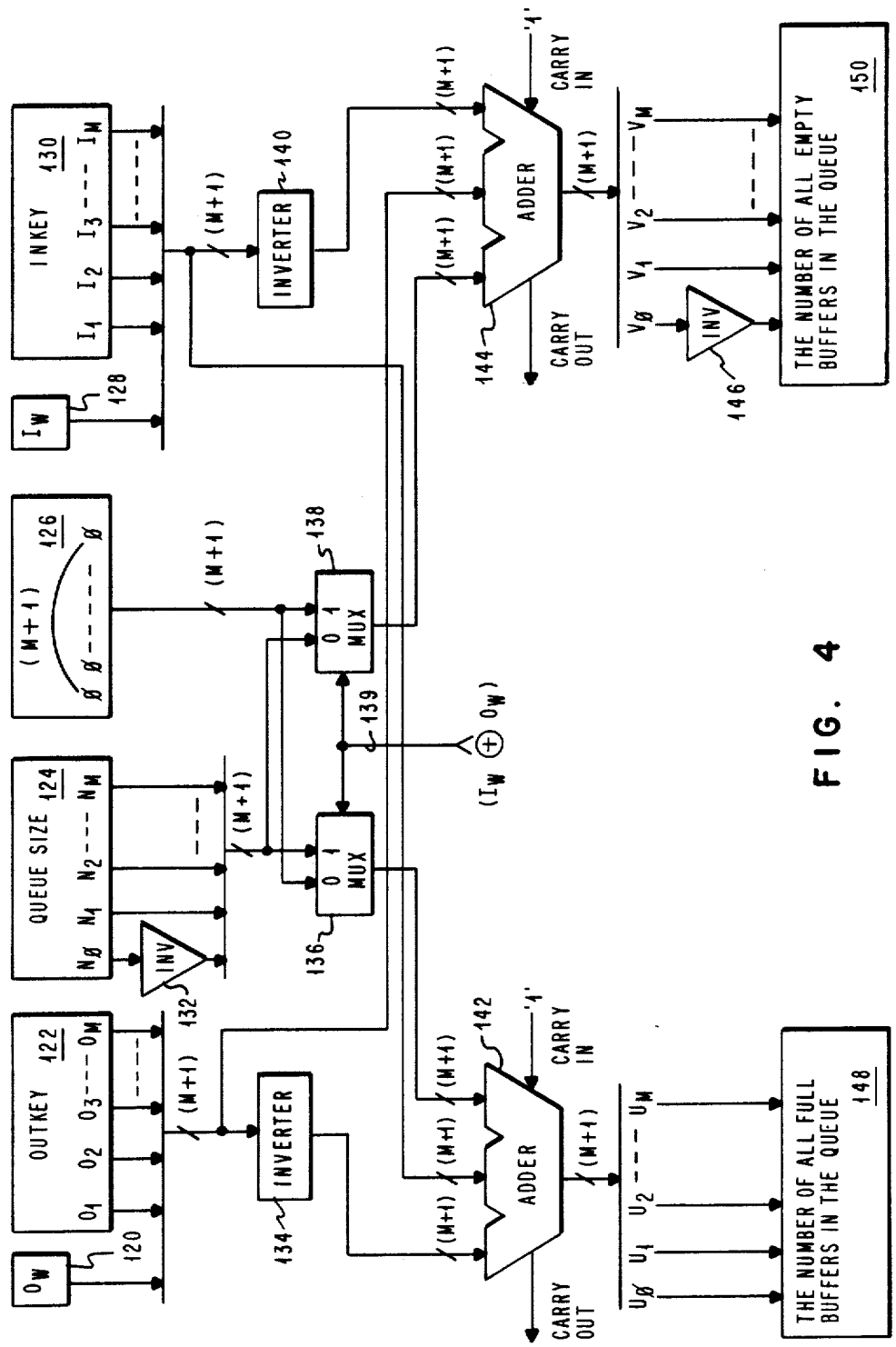
FIG. 4 is a second embodiment of the buffer control circuitry that computes the number of available and the number of filled buffer locations.

A second embodiment of the circuitry used to provide the number of empty locations and the number of full locations is illustrated in FIG. 4. In FIG. 4 the wrap indicators for the outkey and inkey counters have been illustrated as been separated from the latches from the outkey and inkey pointers. The outkey wrap indicator 120 and the outkey pointer latch 122 provide inputs to adder 144 and through inverter 134 to adder 142. The inkey wrap indicator 128 and the inkey pointer latch 130 provide inputs to adder 142 and through inverter 140 to adder 144. Queue size is stored in latch 124. Note that the most significant bit position of the queue size in latch 124 is inverted by inverter 132. The queue size with the inverter most significant bit is provided to multiplexors 136 and 138. A zero correction value in latch 126 is also provided to multiplexors 136 and 138. Multiplexors 136 and 138 are controlled by line 139 which is the Exclusive OR of the inkey wrap indicator 128 and the outkey wrap indicator 120. The output of multiplexor 136 is provided to adder 142. The output of multiplexor 138 is provided to adder 144. The output of adder of 142 is provided to latch 148 representing the number of full locations in the queue. The output of adder 144 is provided to latch 150 to represent the number of all empty locations in the queue. Note that the most significant bit position of the output from adder 144 is inverted by inverter 146 before it is provided to the latch 150.

Figure 5:
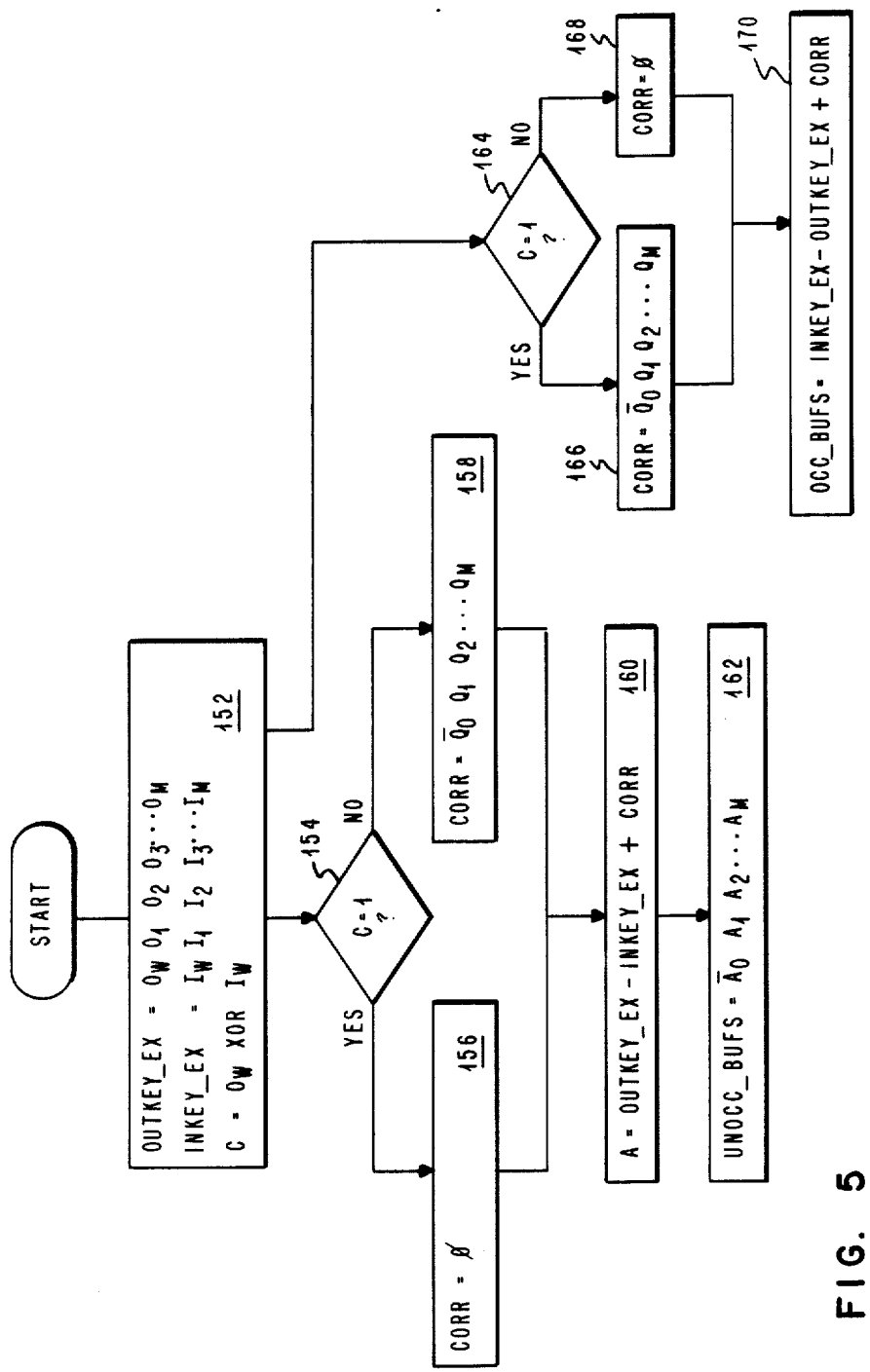
FIG. 5 is a flowchart illustrating the computational flow for the circuitry in FIG. 4.

FIG. 5 represents the computationally flow performed by the circuitry in FIG. 4. In Block 152, the outkey and inkey variables both include the outkey and the inkey wrap indicators. The computations for the Variable C is computed as before, i.e., the Exclusive OR of the outkey wrap key indicator with the inkey wrap indicator. In decision Step 154, it is determined if C is equal to 1. If not, the correction factor is set equal to the queue size with the queue size most significant bit inverted in Step 158. If C is equal to 1, the correction factor is equal to the contents of latch 126 (FIG. 4) which is 0. In Step 160, the Variable A is computed which is equal to the outkey indicator minus the inkey indicator plus the corrections factor. In Step 162 the number of all unoccupied buffer locations are set equal to A with the most significant bit inverted. In Step 164, the correction factor is to be set as in Step 154. In Step 168, the correction factor is set to 0. In Step 166, correction factor is set equal to the queue size with the queue size most significant bit inverted. Then in Step 170, the number of occupied buffers are said equal to the inkey indicator minus the outkey indicator plus the correction factor.

Figure 6:
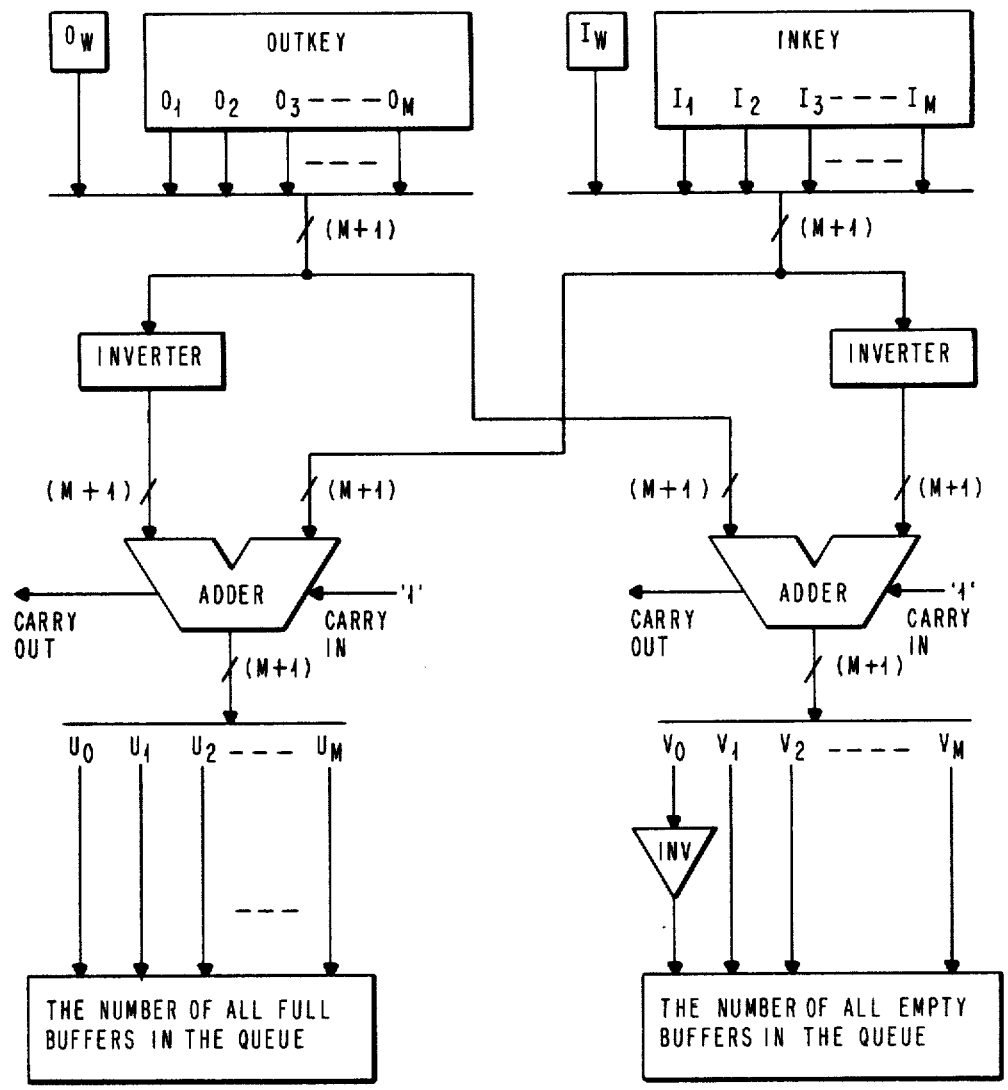
FIG. 6 is a third embodiment of the buffer control circuitry wherein the number of buffer locations is a power of 2.

FIG. 6 illustrates a third embodiment wherein the queue size is required to be equal to a number that is a power of 2. FIG. 6 is similar to FIG. 4 except that the correction factor is not required for the computation.

Figure 7:
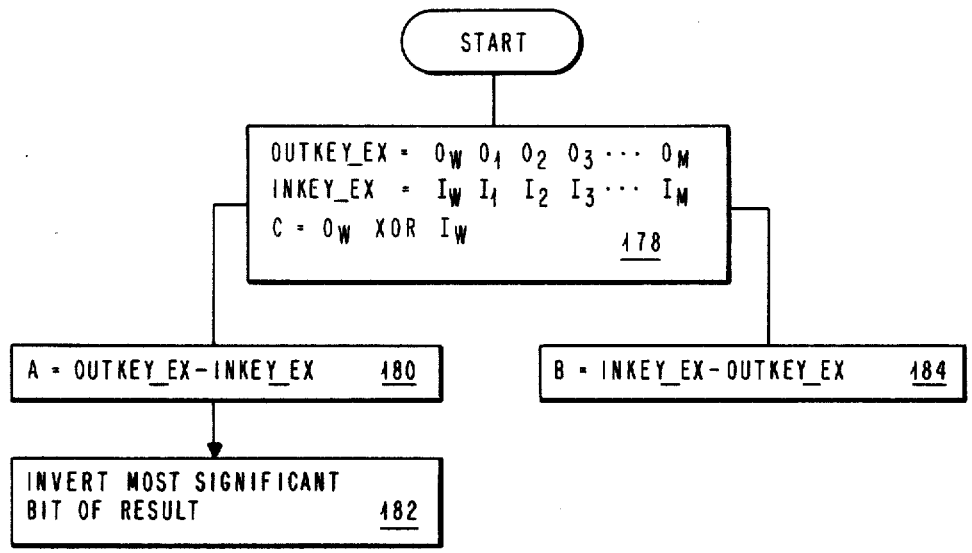
FIG. 7 is a flowchart illustrating the computational flow for the circuitry in FIG. 6.

FIG. 7 illustrates they computational flow from the circuitry in FIG. 6. In FIG. 7, block 178 provides the inkey, outkey (with their respective wrap indicators included) and computes the variable C as before. The Variable A is computed in Block 180 as being the outkey minus the inkey indicators. The most significant bit of A is inverted and is provided in Block 182 as being the number of buffer positions that are empty. The Variable B is computed in Block 184 and is equal to the inkey indicator minus the outkey indicator. This is provided as the number of buffer position that are occupied.

While the invention is being particular set forth and described as referenced to the preferred embodiments illustrated, it should be understood by those skilled in the art that various other changes in form and detail maybe made without departing from the spirit and scope of this invention.

We claim:

1. An apparatus for storing or retrieving data words comprising:
    a plurality of storage locations;
    means, connected to said plurality of storage locations, for transferring a plurality of data words simultaneously during a first time cycle,
    means for providing a first indicator designating a next of said storage locations to be stored into during said first time cycle;
    means for providing a second indicator designating a next of said storage locations to be retrieved from during said first time cycle;
    means for providing a number of said storage locations available for storage or retrieving during said first time cycle; and
    means connected to the storage locations, said transfer means, said first and second indicator means, and said means for providing the available number of storage locations, for either storing or retrieving a plurality of data words of said storage locations simultaneously during said first time cycle.

2. An apparatus according to claim 1 wherein said plurality of data words stored by said storage means is less than the number of storage locations available for storage.

3. An apparatus according to claim 1 wherein said means for providing the available number of storage locations includes a means for providing a number representing the storage locations containing stored data words.

4. An apparatus according to claim 3 wherein said first and second indicator means includes means to increment in a modulo manner.

5. An apparatus according to claim 4 wherein said means for providing the number of available storage locations and the number of filled storage locations includes means for computing a plurality of arithmetic operations simultaneously.

6. An apparatus according to claim 5 wherein said computing means includes means for computing the difference between said first and second indicators.

7. An apparatus according to claim 1 wherein said transfer means includes a parallel bus for transferring data words simultaneously.

8. An apparatus according to claim 7 wherein said transfer means includes a first multiplexer connected to said parallel bus, said first indicator means and said means for providing the number of available storage locations.

9. An apparatus according to claim 8 wherein said transfer means includes a second multiplexer connected to said parallel bus, said second indicator means and said means for providing the number of available storage locations.

10. An apparatus according to claim 1 wherein said means for providing the number of available storage locations includes a plurality of parallel adders connected to said first indicator means and said second indicator means.

11. An apparatus according to claim 10 wherein said means for providing the number of available storage locations includes a register containing the number of storage locations.

12. A method for storing or retrieving data words in a plurality of storage locations in a data processing system comprising the steps of:
providing a first indicator designating a next of said storage locations to be stored into in a first time cycle;
providing a second indicator designating a next of said storage locations to be retrieved from in said first time cycle;
providing a number of said storage locations available for storage or retrieval in said first time cycle; and
providing the available number of storage locations for either storing or retrieving a plurality of data words of said storage locations simultaneously in said first time cycle.

* * * * *